United States Patent
Maekawa et al.

(10) Patent No.: US 11,433,706 B2
(45) Date of Patent: *Sep. 6, 2022

(54) COMPOSITE AND PNEUMATIC TIRE

(71) Applicant: SUMITOMO RUBBER INDUSTRIES, LTD., Kobe (JP)

(72) Inventors: Natsuki Maekawa, Kobe (JP); Koji Fujisawa, Kobe (JP); Hiroshi Ito, Kobe (JP); Ryosuke Harada, Kobe (JP); Daiko Fujimori, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 20 days.

This patent is subject to a terminal disclaimer.

(21) Appl. No.: 17/165,399

(22) Filed: Feb. 2, 2021

(65) Prior Publication Data

US 2021/0155041 A1 May 27, 2021

Related U.S. Application Data

(62) Division of application No. 15/933,006, filed on Mar. 22, 2018, now Pat. No. 10,940,718.

(30) Foreign Application Priority Data

Apr. 19, 2017 (JP) .............................. JP2017-082833
Jun. 1, 2017 (JP) .............................. JP2017-109188

(51) Int. Cl.
*B60C 1/00* (2006.01)
*G01N 23/2273* (2018.01)
*C08K 5/09* (2006.01)
*C08K 3/08* (2006.01)

(52) U.S. Cl.
CPC .............. *B60C 1/0041* (2013.01); *C08K 5/09* (2013.01); *G01N 23/2273* (2013.01); *B60C 2001/0066* (2013.01); *C08K 2003/085* (2013.01)

(58) Field of Classification Search
CPC . B60C 1/0041; B60C 2001/0066; B60C 1/00; B60C 2001/0083; C08K 5/09; C08K 2003/085; C08K 3/04; C08K 3/06; C08K 3/22; C08K 13/02; C08K 2003/2296; G01N 23/2273; C08L 7/00
See application file for complete search history.

(56) References Cited

U.S. PATENT DOCUMENTS

| | | | | |
|---|---|---|---|---|
| 5,861,465 A | * | 1/1999 | Hamada | A63B 37/0078 473/363 |
| 2003/0079817 A1 | * | 5/2003 | Miyazaki | B29C 70/00 152/547 |
| 2013/0302606 A1 | | 11/2013 | Tahara | |
| 2016/0075863 A1 | | 3/2016 | Sakaki et al. | |

FOREIGN PATENT DOCUMENTS

| CN | 1382308 A | 1/2003 |
|---|---|---|
| CN | 1398912 A | 2/2003 |
| CN | 103403082 A | 11/2013 |
| CN | 105264003 A | 1/2016 |
| JP | 4-317912 A | 11/1992 |
| JP | 2005-344000 A | 12/2005 |
| JP | 2009-137538 A | 6/2009 |
| JP | 2010-174169 A | 8/2010 |
| JP | 2012-149134 A | 8/2012 |
| JP | 2012-149149 A | 8/2012 |
| JP | 2014-227491 A | 12/2014 |
| JP | 2015-218280 A | 12/2015 |

OTHER PUBLICATIONS

Author Unknown, "Nippon Gomu Kyokaishi" 1984, 9 pages total, with a partial English translation.
Ishikawa, "Adhesion of Steel Cord to Rubber (3)—Effects of Compound Ingredients on Adhesion Degradation-," Nippon Gomu Kyokaishi, retrieved on Jul. 3, 2017, 7 pages total, with a partial English translation.
Tanaka, Kobunshi, 1997, 5 pages total, with a partial English translation.
Van Ooij, "Mechanism of Rubber-to-Brass Adhesion: Effect of Rubber Composition on the Adhesion," Rubber Chemistry and Technology, vol. 51, 1978, 10 pages total.
Yasunaga et al., "Examining Rubber-brass Inter-reacted Layers of Steel Cord using Cross-sectional TEM Observation." Kobe Steel Engineering Reports, vol. 54, No. 3, Dec. 2004, 6 pages total, with an English abstract.

* cited by examiner

*Primary Examiner* — Andrew J. Oyer
(74) *Attorney, Agent, or Firm* — Birch, Stewart, Kolasch & Birch LLP

(57) ABSTRACT

The present invention provides a composite that has good initial adhesion and good adhesion after high temperature and high humidity aging. Provided is a composite including: a topping rubber composition having a fatty acid content of 0.8% by mass or less; and an adherend plated with a copper-containing layer.

4 Claims, No Drawings

COMPOSITE AND PNEUMATIC TIRE

This application is a Divisional of co-pending U.S. application Ser. No. 15/933,006, filed on Mar. 22, 2018, which is based upon and claims the benefit of priority from Japanese Patent Application No. 2017-082833, filed on Apr. 19, 2017 and Japanese Patent Application No. 2017-109188, filed on Jun. 1, 2017. Each of the above applications is hereby expressly incorporated by reference, in its entirety, into the present application.

TECHNICAL FIELD

The present invention relates to composites such as a rubber/cord composite, pneumatic tires, and an adhesion evaluation method.

BACKGROUND ART

Conventional cord topping rubber compositions for carcasses or belts generally contain a rubber component including, for example, natural rubber, polyisoprene rubber, or styrene-butadiene rubber, a reinforcing filler such as carbon black, and other compounding ingredients.

Since these topping rubber compositions need to adhere to cords, various techniques have been proposed. However, due to the increased demand for performance, further improvements are desired to ensure not only good initial adhesion but also good adhesion after aging.

SUMMARY OF INVENTION

Technical Problem

The present invention aims to solve the problem and provides composites, such as a rubber/cord composite, which have good initial adhesion and good adhesion after high temperature and high humidity aging, and pneumatic tires using them. The present invention also provides an adhesion evaluation method.

Solution to Problem

The present invention relates to a composite, including: a topping rubber composition having a fatty acid content of 0.8% by mass or less; and an adherend plated with a copper-containing layer.

In the composite, preferably a rubber component in the rubber composition consists only of natural rubber.

In the composite, preferably the rubber composition contains a natural rubber having a fatty acid content of 0.8% by mass or less.

In the composite, preferably not more than 0.8% by mass of fatty acids are attached to a surface of the adherend.

Another aspect of the present invention relates to a pneumatic tire, including the composite.

Another aspect of the present invention relates to a rubber/cord composite, including: a cord topping rubber composition having a sulfate ion concentration of 0.8% by mass or less; and a cord plated with a copper-containing layer.

In the rubber/cord composite, preferably a rubber component in the rubber composition consists only of natural rubber.

In the rubber/cord composite, preferably the rubber composition has a sulfate ion concentration of 0.6% by mass or less.

Another aspect of the present invention relates to a pneumatic tire, including the rubber/cord composite.

Another aspect of the present invention relates to an adhesion evaluation method for evaluating adhesion of a rubber/cord composite including a cord topping rubber composition and a cord plated with a copper-containing layer, the method including evaluation based on a sulfate ion concentration in the cord topping rubber composition.

Advantageous Effects of Invention

The composite of the present invention includes a topping rubber composition having a fatty acid content of 0.8% by mass or less and an adherend plated with a copper-containing layer to thereby provide good initial adhesion and good adhesion after high temperature and high humidity aging.

The rubber/cord composite of the present invention includes a cord topping rubber composition having a sulfate ion concentration of 0.8% by mass or less and a cord plated with a copper-containing layer to thereby provide good initial adhesion and good adhesion after high temperature and high humidity aging.

DESCRIPTION OF EMBODIMENTS

[Composite]

The composite of the present invention includes: a topping rubber composition having a fatty acid content of 0.8% by mass or less; and an adherend plated with a copper-containing layer.

The composite of the present invention, which includes a topping rubber composition having a fatty acid content that is equal to or less than a predetermined value and a specified adherend, provides good initial adhesion between the rubber and the adherend plated with a copper-containing layer. Further, it can maintain strong adhesion between the rubber and the adherend even after being left for a long time in a high humidity environment.

[Topping Rubber Composition]

The topping rubber composition (rubber composition for coating the adherend) in the present invention has a fatty acid content of 0.8% by mass or less. This provides good adhesion to the adherend (e.g. cord) to be coated. The fatty acid content is preferably 0.7% by mass or less, more preferably 0.4% by mass or less. A lower fatty acid content is more desirable and there is no critical lower limit.

The fatty acid content of the topping rubber composition (100% by mass) may be measured as described later in EXAMPLES.

Examples of fatty acids that may be included in the present invention include monovalent carboxylic acids (saturated and unsaturated fatty acids) represented by the general formula: $C_nH_mCOOH$ in which n and m each represent an integer of 1 or greater. Typical rubber compositions contain fatty acids such as those derived from a non-rubber component in natural rubber and those incorporated as additives (e.g. stearic acid). In the topping rubber composition, the amount of such fatty acids is small.

Natural rubber is produced by common methods such as for example by sequentially performing steps of tapping of natural rubber latex, coagulation, washing, dehydration, drying, and packaging. If fatty acids derived from a non-rubber component in natural rubber remain in the produced natural rubber or a rubber composition containing it, a rubber/adherend composite (e.g. a belt or carcass) produced by coating an adherend such as a cord plated with a copper-containing layer with such a rubber composition is poor in adhesion (initial adhesion and adhesion after high temperature and high humidity aging) between the rubber composition and the adherend.

According to the present invention, the topping rubber composition is adjusted to have a fatty acid content that is equal to or less than a predetermined value in order to improve not only initial adhesion but also adhesion after high temperature and high humidity aging.

The topping rubber composition having the predetermined fatty acid content according to the present invention may be prepared, for example, by using a natural rubber (NR) having a low fatty acid content as a rubber component or reducing the amount of stearic acid and other fatty acids incorporated as additives.

The NR in the topping rubber composition preferably has a fatty acid content of 0.9% by mass or less, more preferably 0.8% by mass or less, still more preferably 0.4% by mass or less. A lower fatty acid content is more desirable and there is no critical lower limit.

The fatty acid content in NR (100, by mass) may be measured as described later in EXAMPLES.

Such a NR having a low fatty acid content may be produced, for example, by the aforementioned common NR production method in which the coagulation step is performed with sulfuric acid or the like, and the coagulated rubber (aggregated rubber particles) is washed vigorously to remove the fatty acids present as a non-rubber component.

The NR having a low fatty acid content may suitably be a modified natural rubber which has a low fatty acid content and which is highly purified and adjusted to have a pH of 2 to 7. The modified natural rubber may be prepared by, for example, the method disclosed in WO 2014/125700 (which is incorporated by reference herein in its entirety), particularly using sulfuric acid in the coagulation step. Thus, the coagulation step is performed with sulfuric acid, followed by vigorous washing, whereby a modified natural rubber having a low fatty acid content can be produced.

The modified natural rubber has a pH of 2 to 7, preferably 3 to 6, more preferably 4 to 6. The pH of the modified natural rubber is determined by cutting the rubber into pieces at most 2 mm square on each side, immersing the pieces in distilled water, irradiating the immersed pieces with microwaves for extraction at 90° C. for 15 minutes, and measuring the resulting immersion water with a pH meter. Specifically, the pH is determined as described later in EXAMPLES.

The modified natural rubber preferably has a phosphorus content of 200 ppm or less, more preferably 150 ppm or less. The phosphorus content may be measured by conventional methods, such as ICP emission spectrometry.

The modified natural rubber preferably has a nitrogen content of 0.15% by mass or less, more preferably 0.1% by mass or less after it is immersed in acetone at room temperature (25° C.) for 48 hours. The nitrogen content is measured after the artificial antioxidants in the rubber are removed by extraction with acetone. The nitrogen content may be measured by conventional methods, such as the Kjeldahl method or the use of a trace nitrogen analyzer. The nitrogen is derived from proteins and amino acids.

The modified natural rubber may be prepared by, for example, a production method including Step 1-1 of saponifying natural rubber latex, Step 1-2 of washing the saponified natural rubber latex, and Step 1-3 of treating the latex with an acidic compound.

(Step 1-1)

Step 1-1 includes saponifying natural rubber latex. The saponification may be carried out by adding an alkali and optionally a surfactant to natural rubber latex and leaving the mixture for a certain period of time at a predetermined temperature. Stirring or the like may be performed as needed.

(Step 1-2)

Step 1-2 includes washing the saponified natural rubber latex obtained in Step 1-1.

For example, Step 1-2 may be carried out by coagulating (solidifying) the saponified natural rubber latex obtained in Step 1-1 to give a coagulated rubber (aggregated rubber particles), and treating the coagulated rubber with a basic compound, followed by washing. Specifically, after a coagulated rubber is produced, it is diluted with water to transfer the water-soluble components to the aqueous phase, and then the water is removed, whereby the non-rubber components can be removed. Further, the coagulated rubber is treated with a basic compound so that the non-rubber components which have been trapped inside the rubber during the coagulation can be redissolved. Thus, non-rubber components firmly attached inside the coagulated rubber, such as proteins and fatty acids, sulfate ions, and the like can be removed.

An exemplary coagulation (solidification) method may include adding an acid such as sulfuric acid to adjust the pH, and optionally further adding a polymer flocculant. This method does not produce large coagula, but produces a particulate rubber having a diameter in the order of between not more than one to a few millimeters and 20 mm, and then proteins and the like in the rubber are sufficiently removed by the treatment with a basic compound. The sulfuric acid is preferably a sulfuric acid aqueous solution with a sulfuric acid concentration of 85% by mass or less, more preferably 60% by mass or less, still more preferably 50% by mass or less. The pH is preferably adjusted within the range of 3.0 to 5.0, more preferably 3.5 to 4.5.

Next, the coagulated rubber (aggregated rubber particles) thus obtained is treated with a basic compound. The basic compound is not particularly limited. Basic inorganic compounds are suitable because of their ability to remove proteins, fatty acids, and the like.

Examples of the basic inorganic compounds include metal hydroxides such as alkali metal hydroxides and alkaline earth metal hydroxides; metal carbonates such as alkali metal carbonates and alkaline earth metal carbonates; metal hydrogen carbonates such as alkali metal hydrogen carbonates; metal phosphates such as alkali metal phosphates; metal acetates such as alkali metal acetates; metal hydrides such as alkali metal hydrides; and ammonia. Preferred among these are metal hydroxides, metal carbonates, metal hydrogen carbonates, metal phosphates, and ammonia, with sodium carbonate or sodium hydrogen carbonate being more preferred.

The coagulated rubber may be treated with a basic compound by any method that allows the coagulated rubber to be brought into contact with the basic compound. Examples include a method of immersing the coagulated rubber in an aqueous solution of the basic compound, and a method of spraying an aqueous solution of the basic compound onto the coagulated rubber. The aqueous solution of the basic compound may be prepared by diluting and dissolving the basic compound in water.

The aqueous solution of the basic compound preferably has a pH of 9 to 13. In view of treatment efficiency, the pH is more preferably 10 to 12. The treatment temperature is preferably 10 to 50° C., and the treatment time is usually one minute to 48 hours.

Washing is performed after the treatment with a basic compound. This process allows the non-rubber components such as proteins and fatty acids which have been trapped inside the rubber during the coagulation to be sufficiently removed and, at the same time, allows the basic compound, sulfate ions, and the like present inside the coagulated rubber as well as those on the surface to be sufficiently removed. In particular, the removal of basic compounds remaining in the entire rubber in the washing process permits the entire rubber to sufficiently undergo a treatment with an acidic compound as described later. Thus, the pH not only of the surface but also inside of the rubber can be adjusted to 2 to 7.

The washing may suitably be carried out by methods that can sufficiently remove the non-rubber components, basic compound, sulfate ions, and the like contained in the entire rubber. For example, it may be carried out by a method in which the rubber component is diluted and washed in water, followed by centrifugation or followed by standing to allow the rubber to float and then draining only the aqueous phase to collect the rubber component. The number of washing cycles may be arbitrarily chosen as long as the amounts of the non-rubber components such as proteins and fatty acids, basic compound, and sulfate ions can be reduced to desired levels. In the case of repeating a washing cycle which consists of adding 1,000 mL of water per 300 g of dry rubber, stirring the mixture, and then removing water, the number of washing cycles is preferably 3 (3 cycles) or more, more preferably 5 (5 cycles) or more, still more preferably 7 (7 cycles) or more.

The washing process is preferably performed until the rubber has a phosphorus content of 200 ppm or less and/or has a nitrogen content of 0.15% by mass or less.

(Step 1-3)

Step 1-3 includes treating the washed rubber obtained in Step 1-2 with an acidic compound. This treatment adjusts the pH of the entire rubber to 2 to 7 as described above, thereby providing a modified natural rubber excellent in the aforementioned properties.

Non-limiting examples of the acidic compound include inorganic acids such as hydrochloric acid, nitric acid, phosphoric acid, polyphosphoric acid, metaphosphoric acid, boric acid, boronic acid, sulfanilic acid, and sulfamic acid; and organic acids such as formic acid, acetic acid, glycolic acid, oxalic acid, propionic acid, malonic acid, succinic acid, adipic acid, maleic acid, and malic acid. Preferred among these are acetic acid, formic acid, and the like.

The coagulated rubber may be treated with an acid by any method that allows the coagulated rubber to be brought into contact with the acidic compound. Examples include a method of immersing the coagulated rubber in an aqueous solution of the acidic compound, and a method of spraying an aqueous solution of the acidic compound onto the coagulated rubber. The treatment temperature is preferably 10 to 50° C., and the treatment time is usually three seconds to 24 hours.

In the case of treatment such as immersion in an aqueous solution of the acidic compound, the pH is preferably adjusted to 6 or lower. The upper limit of the pH is more preferably 5 or lower, still more preferably 4.5 or lower. The lower limit of the pH is not particularly critical, and it is preferably 1 or higher, more preferably 2 or higher, because too strong acidity may cause degradation of the rubber and may complicate the wastewater disposal, though depending on the duration of immersion. The immersion treatment may be carried out, for example, by leaving the coagulated rubber in an aqueous solution of the acidic compound.

After the above treatment, the compound used in the treatment with an acidic compound is removed, and then the treated coagulated rubber may appropriately be washed. The washing process may be carried out in the same manner as described above. For example, washing may be repeated to further reduce and adjust the amounts of the non-rubber components, sulfate ions, and the like to desired levels. Moreover, the coagulated rubber obtained after the treatment with an acidic compound may be formed into a sheet or the like by squeezing it with, for example, a roll squeezer. The additional step of squeezing the coagulated rubber allows the surface and inside of the coagulated rubber to have a uniform pH so that the resulting rubber has desired properties. After the washing and/or squeezing steps are optionally performed, the resulting rubber is milled on a creper and dried, whereby the modified natural rubber can be produced. The drying may be carried out using common driers.

In the topping rubber composition, the amount of NR such as the modified natural rubber based on 100% by mass of the rubber component is preferably 80% by mass or more, more preferably 90% by mass or more, still more preferably 100% by mass. When the amount is 80% by mass or more, good properties such as adhesion and fuel economy can be obtained.

In addition to NR, the rubber component may further include other rubbers as long as they do not inhibit the effects of the present invention. Examples of other rubbers include epoxidized natural rubber (ENR), polyisoprene rubber (IR), styrene-butadiene rubber (SBR), polybutadiene rubber (BR), chloroprene rubber (CR), butyl rubber (IIR), halogenated butyl rubber (X-IIR), and styrene-isoprene-butadiene rubber (SIBR).

The topping rubber composition preferably contains carbon black to enhance rubber strength and other properties. Non-limiting examples of the carbon black include GPF, FEF, HAF, ISAF, and SAF.

The carbon black preferably has a nitrogen adsorption specific surface area ($N_2SA$) of 50 $m^2/g$ or more, more preferably 65 $m^2/g$ or more. A $N_2SA$ of 50 $m^2/g$ or more tends to enhance adhesion between the rubber composition and tire cords. The $N_2SA$ of the carbon black is preferably 150 $m^2/g$ or less, more preferably 130 $m^2/g$ or less. A $N_2SA$ of 150 $m^2/g$ or less tends to lead to good low heat build-up properties.

The $N_2SA$ of carbon black can be determined by the method A in accordance with JIS K6217-7.

The amount of carbon black per 100 parts by mass of the rubber component is preferably 5 parts by mass or more, more preferably 20 parts by mass or more. An amount of 5 parts by mass or more tends to enhance adhesion between the rubber composition and tire cords. The amount of carbon black is also preferably 80 parts by mass or less, more preferably 65 parts by mass or less. An amount of 80 parts by mass or less tends to lead to good low heat build-up properties.

The topping rubber composition preferably contains sulfur as a vulcanizing agent.

The amount of sulfur per 100 parts by mass of the rubber component is preferably 2.5 parts by mass or more, more preferably 2.8 parts by mass or more. When the amount is 2.5 parts by mass or more, the layer adhered to tire cords tends to be sufficiently supplied with sulfur so that good adhesion can be obtained. The amount is also preferably 10 parts by mass or less, more preferably 8 parts by mass or less, still more preferably 6 parts by mass or less. An amount of 10 parts by mass or less tends to lead to sufficient rubber properties such as stress at break and elongation at break.

The topping rubber composition may contain a vulcanization accelerator. Examples of the vulcanization accelerator include sulfenamide, thiazole, thiuram, thiourea, guanidine, dithiocarbamate, aldehyde-amine, aldehyde-ammonia, imidazoline, and xanthate vulcanization accelerators. Among these, sulfenamide vulcanization accelerators are preferred because of their excellent crosslinkability. Examples of sulfenamide vulcanization accelerators include sulfenamide compounds such as CBS (N-cyclohexyl-2-benzothiazolylsulfenamide), TBBS (N-t-butyl-2-benzothiazolylsulfenamide), N,N-dicyclohexyl-2-benzothiazolylsulfenamide, N-oxydiethylene-2-benzothiazolylsulfenamide, and N,N-diisopropyl-2-benzothiazole sulfenamide.

In addition to the aforementioned components, the topping rubber composition may appropriately contain additives usually used in the rubber industry, including, for example, stearic acid, various types of antioxidants, waxes, and oils such as aromatic oils.

In view of adhesion, the amount of fatty acids (stearic acid and the like) added as additives in the topping rubber composition is preferably 1.0 part by mass or less, more preferably 0.5 parts by mass or less per 100 parts by mass of the rubber component, and no fatty acid may be added.

The topping rubber composition may be prepared by known methods. For example, it may be prepared by kneading the components with a rubber kneading machine such as an open roll mill, Banbury mixer, or internal mixer and vulcanizing the kneaded mixture.

The vulcanization of the topping rubber composition (vulcanized rubber composition) is preferably carried out under vulcanization conditions in which the amount of curing heat is 35 to 65 ECU and the curing temperature is 150 to 190° C. In order to cure rubber, it is necessary to apply an amount of heat required for curing, as described in, for example, The Society of Rubber Science and Technology, Japan, vol. 59, No. 3, p. 129 (1986) (which is incorporated by reference herein in its entirety). With regard to the amount of curing heat, 1 ECU is defined as the equivalent cure unit corresponding to the amount of heat applied at a reference temperature of 149.5° C. for one minute (60 seconds). For example, if vulcanization is performed at 149.5° C. for 30 minutes, the amount of curing heat is 30 ECU.

Vulcanization under the conditions indicated above provides good adhesion (initial adhesion and adhesion after high temperature and high humidity aging). More suitably, the amount of curing heat is 40 to 55 ECU and the curing temperature is 150 to 185° C.

The topping rubber composition is used as a rubber composition for coating tire cords such as carcass or band cords. Specifically, it may be used for carcasses as illustrated in, for example, the drawings of JP 2009-13220 A (which is incorporated by reference herein in its entirety) or bands as illustrated in, for example, the drawings of JP H06-270606 A (which is incorporated by reference herein in its entirety).

[Adherend Plated with Copper-Containing Layer]

The adherend of the composite (rubber-adherend composite) may be, for example, a cord. The cord plated with a copper-containing layer may suitably be a steel cord plated with a copper-containing layer. Non-limiting examples of the steel cord include steel cords having a 1×n single strand structure and steel cords having a k+m layer strand structure. The term "steel cord having a 1×n single strand structure" refers to a single-layered twisted steel cord formed by intertwining n filaments. The term "steel cord having a k+m layer strand structure" refers to a steel cord having a two-layered structure in which the two layers are different from each other in twist direction and twist pitch, and the inner layer includes k filaments while the outer layer includes m filaments. Here, n represents an integer of 1 to 27; k represents an integer of 1 to 10; and m represents an integer of 1 to 3. In view of adhesion to the rubber composition, the copper-containing plating layer may suitably be a brass plating layer.

The composite is produced by coating an adherend (e.g. a cord) plated with a copper-containing layer with the topping rubber composition. The composite can be suitably used as a tire component which is prepared by coating the cord with rubber (e.g., belts, breakers, carcasses).

In the rubber-adherend composite, preferably not more than 0.8% by mass of fatty acids are attached to the surface of the adherend. In this case, good adhesion (initial adhesion and adhesion after high temperature and high humidity aging) can be obtained. The amount of attached fatty acids is more preferably 0.6, by mass or less, still more preferably 0.3% by mass or less. A lower amount of attached fatty acids is more desirable and there is no critical lower limit.

The amount of fatty acids attached to the surface of the adherend may be measured as described later in EXAMPLES.

[Pneumatic Tire Including Composite]

The pneumatic tire of the present invention may be prepared by, for example, the following process.

First, an adherend (e.g. a cord) plated with a copper-containing layer is coated with the topping rubber composition, and then formed into a tire component such as a belt. Then, the tire component is assembled with other tire components to build an unvulcanized tire. The unvulcanized tire is then vulcanized, whereby a pneumatic tire of the present invention can be produced.

[Rubber/Cord Composite]

The rubber/cord composite of the present invention includes: a cord topping rubber composition having a sulfate ion concentration of 0.8% by mass or less; and a cord plated with a copper-containing layer.

The rubber/cord composite of the present invention, which includes a cord topping rubber composition having a sulfate ion content that is equal to or less than a predetermined value and a specified cord, provides good initial adhesion between the rubber and the cord plated with a copper-containing layer. Further, it can maintain strong adhesion between the rubber and the cord even after being left for a long time in a high humidity environment.

[Cord Topping Rubber Composition]

The cord topping rubber composition in the present invention has a sulfate ion concentration of 0.8% by mass or less. This provides good adhesion to the cord. The sulfate ion concentration is preferably 0.6% by mass or less. A lower sulfate ion concentration is more desirable and there is no critical lower limit.

The sulfate ion concentration in the cord topping rubber composition (100% by mass) may be measured as described later in EXAMPLES.

Natural rubber is produced by common methods such as for example by sequentially performing steps of tapping of natural rubber latex, acid coagulation, washing, dehydration, drying, and packaging. In the coagulation step, the use of sulfuric acid has prevailed because it can reduce the time for coagulation and is also inexpensive. However, if sulfate ions remain in the produced natural rubber or a rubber composition containing it, a rubber/cord composite (e.g. a belt or carcass) produced by coating a cord plated with a copper-containing layer with such a rubber composition is poor in adhesion (initial adhesion and adhesion after high temperature and high humidity aging) between the rubber composition and the cord.

According to the present invention, the cord topping rubber composition is adjusted to have a sulfate ion concentration that is equal to or less than a predetermined value in order to improve not only initial adhesion but also adhesion after high temperature and high humidity aging, even when sulfuric acid is used in the coagulation step.

The cord topping rubber composition having the predetermined sulfate ion concentration according to the present invention may be prepared, for example, by using a natural rubber (NR) having a low sulfate ion content as a rubber component.

The NR in the cord topping rubber composition preferably has a sulfate ion concentration (sulfate ion content) of 0.6% by mass or less, more preferably 0.5% by mass or less, still more preferably 0.3% by mass or less. A lower sulfate ion concentration is more desirable and there is no critical lower limit.

The sulfate ion concentration in NR (100% by mass) may be measured as described later in EXAMPLES.

Such a NR having a low sulfate ion concentration may be produced, for example, by the aforementioned common NR production method in which the coagulation step is performed with sulfuric acid, and then sulfate ions derived from the sulfuric acid are removed.

The NR having a low sulfate ion concentration may suitably be, for example, a modified natural rubber which has a low sulfate ion concentration and which is highly purified and adjusted to have a pH of 2 to 7. The modified natural rubber may be prepared by, for example, the method disclosed in WO 2014/125700 (which is incorporated by reference herein in its entirety), particularly using sulfuric acid in the coagulation step. Thus, a modified natural rubber having a low sulfate ion concentration can be produced, even when sulfuric acid is used in the coagulation step.

The pH, phosphorus content, and nitrogen content of the modified natural rubber preferably fall within the ranges stated earlier. The modified natural rubber may be produced as described earlier.

In the cord topping rubber composition, the amount of NR such as the modified natural rubber based on 100% by mass of the rubber component is preferably 80% by mass or more, more preferably 90% by mass or more, still more preferably 100% by mass. When the amount is 80% by mass or more, good properties such as adhesion and fuel economy can be obtained.

Examples of other rubbers that may be used in combination in the cord topping rubber composition include those listed earlier. Examples of the carbon black, vulcanizing agent (e.g. sulfur), and vulcanization accelerator include those listed earlier. The amounts of carbon black and sulfur preferably fall within the ranges stated earlier. The additives listed earlier may be incorporated.

The cord topping rubber composition may be prepared as described earlier.

The cord topping rubber composition is likewise used as a rubber composition for coating tire cords such as carcass or band cords.

[Cord Plated with Copper-Containing Layer]

The cord plated with a copper-containing layer of the rubber/cord composite may suitably be a steel cord plated with a copper-containing layer as described earlier.

The rubber/cord composite is produced by coating a cord plated with a copper-containing layer with the cord topping rubber composition. The rubber/cord composite can be suitably used as a tire component which is prepared by coating the cord with rubber (e.g., a belt, breaker, or carcass).

[Pneumatic Tire Including Rubber/Cord Composite]

The pneumatic tire of the present invention may be prepared, for example, as described earlier.

[Adhesion Evaluation Method]

The adhesion evaluation method of the present invention is a method for evaluating adhesion of a rubber/cord composite including a cord topping rubber composition and a cord plated with a copper-containing layer, the method including evaluation based on the sulfate ion concentration in the cord topping rubber composition.

As described earlier, the rubber/cord composite including a cord topping rubber composition and a cord plated with a copper-containing layer can be evaluated for adhesion (initial adhesion and adhesion after high temperature and high humidity aging) between the rubber composition and the cord by using the sulfate ion concentration in the rubber composition. Specifically, since not only initial adhesion but also adhesion after high temperature and high humidity aging can be improved by reducing the sulfate ion concentration in the cord topping rubber composition to adjust it to, for example, 0.8% by mass or less, the adhesion can be evaluated based on the sulfate ion concentration.

EXAMPLES

The present invention will be specifically described with reference to, but not limited to, the examples below.

The chemicals used in production examples and comparative production examples are listed below.

Field latex: field latex available from Muhibbah Lateks

EMAL E-27C (surfactant): EMAL E-27C (sodium polyoxyethylene lauryl ether sulfate, active ingredient: 27% by mass) available from Kao Corporation NaOH: NaOH available from Wako Pure Chemical Industries, Ltd.

Wingstay L (antioxidant): Wingstay L (butylated condensate of p-cresol and dicyclopentadiene) available from Eliokem Emulvin W (surfactant): Emulvin W (aromatic polyglycol ether) available from Lanxess Tamol NN 9104 (surfactant): Tamol NN 9104 (sodium salt of naphthalenesulfonic acid/formaldehyde) available from BASF Van gel B (surfactant): Van gel B (hydrated magnesium aluminum silicate) available from Vanderbilt Examples and Comparative Examples (Preparation of Antioxidant Dispersion)

An amount of 462.5 g of water was mixed with 12.5 g of Emulvin W, 12.5 g of Tamol NN 9104, 12.5 g of Van gel B, and 500 g of Wingstay L (total amount of mixture: 1,000 g) for 16 hours using a ball mill to prepare an antioxidant dispersion.

Production Example 1-1

The solids concentration (DRC) of field latex was adjusted to 30% (w/v). Then, 1,000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for two hours, and then water was further added to dilute the mixture until the rubber concentration reached 15% (w/v). Thereafter, sulfuric acid (concentration: 50% by mass) was added with slow stirring to adjust the pH to 4.0. Subsequently, a cationic polymer flocculant was added and the mixture was stirred for two minutes, so that coagulation occurred. The thus obtained coagulum (coagulated rubber) had a diameter of approximately 0.5 to 5 mm. The coagulum was taken out and immersed in 1,000 mL of a 2% by mass aqueous solution of sodium carbonate for four hours at room temperature, and then the rubber was taken out. The rubber was combined with 2,000 mL of water and the mixture was stirred for two minutes and then dehydrated as much as possible. This cycle of operation was repeated seven times. Thereafter, 500 mL of water was added, and 2, by mass formic acid was added to pH 4, followed by leaving the mixture for 15 minutes. The mixture was then dehydrated as much as possible and combined with water again, followed by stirring for two minutes. This cycle of operation was repeated three times. Then, water was squeezed off from the resulting rubber with a water squeezing roll to form the rubber into a sheet, followed by drying for four hours at 90° C. In this manner, a solid rubber (highly purified natural rubber 1-A) was prepared.

Production Example 1-2

A solid rubber (highly purified natural rubber 1-B) was prepared as in Production Example 1-1, except that the washing cycle was repeated five times instead of seven times.

Comparative Production Example 1-1

A solid rubber (highly purified natural rubber 1-a) was prepared as in Production Example 1-1, except that the washing cycle was repeated three times instead of seven times.

Production Example 2-1

The solids concentration (DRC) of field latex was adjusted to 30% (w/v). Then, 1,000 g of the latex was combined with 25 g of a 10% aqueous solution of EMAL E-27C and 60 g of a 25% NaOH aqueous solution, and the mixture was saponified for 24 hours at room temperature to prepare a saponified natural rubber latex. Next, 6 g of the antioxidant dispersion was added and the mixture was stirred for two hours, and then water was further added to dilute the mixture until the rubber concentration reached 15% (w/v). Thereafter, sulfuric acid (concentration: 50% by mass) was added with slow stirring to adjust the pH to 3.6. Subsequently, a cationic polymer flocculant was added and the mixture was stirred for two minutes, so that coagulation occurred. The thus obtained coagulum (coagulated rubber) had a diameter of approximately 0.5 to 5 mm. The coagulum was taken out and immersed in 1,000 mL of a 2% by mass aqueous solution of sodium carbonate for four hours at room temperature, and then the rubber was taken out. The rubber was combined with 2,000 mL of water and the mixture was stirred for two minutes and then dehydrated as much as possible. This cycle of operation was performed seven times. Thereafter, 500 mL of water was added, and 2, by mass formic acid was added to pH 4, followed by leaving the mixture for 15 minutes. The mixture was then dehydrated as much as possible and combined with water again, followed by stirring for two minutes. This cycle of operation was repeated three times. Then, water was squeezed off from the resulting rubber with a water squeezing roll to form the rubber into a sheet, followed by drying for four hours at 90° C. In this manner, a solid rubber (highly purified natural rubber 2-A) was prepared.

Production Example 2-2

A solid rubber (highly purified natural rubber 2-B) was prepared as in Production Example 2-1, except that the pH was adjusted to 1.5 by adding sulfuric acid (concentration: 85% by mass), instead of adjusting the pH to 3.6 by adding sulfuric acid (concentration: 50% by mass).

Comparative Production Example 2-1

A solid rubber (highly purified natural rubber 2-a) was prepared as in Production Example 2-1, except that the pH was adjusted to 1.3 by adding sulfuric acid (concentration: 100% by mass), instead of adjusting the pH to 3.6 by adding sulfuric acid (concentration: 50% by mass).

The chemicals used in the examples and comparative examples are listed below.

NR 1-1 to NR 1-3: see Production Examples 1-1 and 1-2 and Comparative Production Example 1-1

NR 2-1 to NR 2-3: see Production Examples 2-1 and 2-2 and Comparative Production Example 2-1

Carbon black: SHOBLACK N339 ($N_2SA$: 88 m$^2$/g) available from Cabot Japan K.K.

Stearic acid: stearic acid available from NOF Corporation

Zinc oxide: zinc oxide #1 available from Mitsui Mining & Smelting Co., Ltd.

Antioxidant: NOCRAC 6C available from Ouchi Shinko Chemical Industrial Co., Ltd.

Oil: process oil

90% insoluble sulfur: Sanfel EX available from Sanshin Chemical Industry Co., Ltd.

Vulcanization accelerator: NOCCELER DZ available from Ouchi Shinko Chemical Industrial Co., Ltd.

Examples and Comparative Examples

According to the formulation proportions indicated in Table 1-2 or 2-2, the materials other than the 90% insoluble sulfur and vulcanization accelerator were kneaded for seven minutes using a 1.7 L Banbury mixer to give a kneaded mixture. Subsequently, according to the formulation proportions indicated in Table 1-2 or 2-2, the kneaded mixture, 90% insoluble sulfur, and vulcanization accelerator were kneaded using an open roll mill at 100° C. for two minutes to prepare a sheet of an unvulcanized rubber composition.

Next, a steel cord (plated with brass (Cu: 63% by mass, Zn: 37% by mass), 1×2 single strand structure, outer diameter: 0.59 mm, outer diameter of filament: 0.295 mm) was coated with the unvulcanized rubber composition, and the composite was formed into a belt and assembled with other tire components on a tire building machine to build an unvulcanized tire. The unvulcanized tire was vulcanized under the conditions indicated in Table 1-2 or 2-2 to prepare a test tire (tire size: 185/70R14).

The solid rubbers, rubber compositions, cord, and rubber/cord composites prepared as above were evaluated as follows. Tables 1-1 and 1-2 and Tables 2-1 and 2-2 show the results.

<Measurement of Fatty Acid Content (Amount of Attached Fatty Acids)>

The solid rubbers and the rubber compositions containing them were measured for fatty acid content and the amount of fatty acids attached to the cord surface by fatty acid quantitation using reactive pyrolysis techniques. The fatty acids were measured by ATR-FTIR and identified by the peak at 1711 cm$^{-1}$.

<Measurement of Sulfate Ion Concentration>

The solid rubbers and the rubber compositions containing them were measured for sulfate ion concentration by ESCA (X-ray photoelectron spectroscopy).

<Measurement of pH>

Each solid rubber in an amount of 5 g was cut into pieces so that the sum of the three dimensions of each piece was 5 mm or less (about 1-2 mm×about 1-2 mm×about 1-2 mm). The pieces were placed in a 100 mL beaker and combined with 50 mL of distilled water at room temperature. The contents were heated to 90° C. over two minutes, followed by irradiation with microwaves (300 W) for 13 minutes (total 15 minutes) while adjusting and maintaining the temperature at 90° C. Then, after the resulting immersion water was cooled to 25° C. using an ice bath, the pH of the immersion water was measured with a pH meter.

<Measurement of Nitrogen Content>

(Acetone Extraction (Preparation of Specimen))

Each solid rubber was finely cut into sample pieces 1 mm square, and about 0.5 g of the sample was weighed. The sample was immersed in 50 g of acetone at room temperature (25° C.) for 48 hours. Then, the rubber was taken out and dried. Thus, specimens (from which antioxidants had been extracted) were prepared.

(Measurement)

The nitrogen content of the specimens was measured by the following method.

The acetone-extracted specimens obtained as above were decomposed and gasified using a trace nitrogen/carbon analyzer "SUMIGRAPH NC 95A (Sumika Chemical Analysis Service, Ltd.)", and the gas generated was analyzed using a gas chromatograph "GC-8A (Shimadzu Corporation)" to determine the nitrogen content.

<Measurement of Phosphorus Content>

The phosphorus content of the solid rubbers was determined using an ICP emission spectrometer (P-4010, Hitachi, Ltd.).

<Initial Adhesion>

A belt ply was taken out of each just prepared test tire and then pulled at a speed of 50 mm/min using a tensile tester in accordance with JIS K6256-1 to determine the percentage of coated steel cords. The results are expressed as an index, with Comparative Example 1-1 (Table 1-2) or Comparative Example 2-1 (Table 2-2) set equal to 100. A higher index indicates better initial adhesion between the steel cords and the topping rubber.

<Adhesion after Aging>

Each prepared test tire was left for aging for 10 days at a temperature of 70° C. and a relative humidity of 95%. Thereafter, a belt ply was taken out of the aged test tire and then pulled at a speed of 50 mm/min using a tensile tester in accordance with JIS K6256-1 to determine the percentage of coated steel cords. The results are expressed as an index, with Comparative Example 1-1 (Table 1-2) or Comparative Example 2-1 (Table 2-2) set equal to 100. A higher index indicates better adhesion between the steel cords and the topping rubber after high temperature and high humidity aging.

TABLE 1-1

|  | NR 1-1 (Highly purified natural rubber 1-A) | NR 1-2 (Highly purified natural rubber 1-B) | NR 1-3 (Highly purified natural rubber 1-a) |
|---|---|---|---|
| pH | 4 | 4 | 4 |
| Nitrogen content (% by mass) | 0.08 | 0.10 | 0.13 |
| Phosphorus content (ppm) | 140 | 160 | 180 |
| Fatty acid content (% by mass) | 0.4 | 0.8 | 1.0 |

TABLE 1-2

|  |  | Example 1-1 | Example 1-2 | Example 1-3 | Example 1-4 | Example 1-5 | Comparative Example 1-1 |
|---|---|---|---|---|---|---|---|
| Topping rubber composition Formulation (parts by mass) | NR 1-1 (Solid rubber (Highly purified natural rubber 1-A)) | 100 |  |  |  | 100 |  |
|  | NR 1-2 (Solid rubber (Highly purified natural rubber 1-B)) |  | 100 | 100 | 100 |  |  |
|  | NR 1-3 (Solid rubber (Highly purified natural rubber 1-a)) |  |  |  |  |  | 100 |
|  | Carbon black | 50 | 50 | 50 | 50 | 50 | 50 |
|  | Zinc oxide | 5 | 5 | 5 | 5 | 5 | 5 |
|  | Antioxidant | 1 | 1 | 1 | 1 | 1 | 1 |
|  | Sulfur | 5 | 5 | 5 | 5 | 5 | 5 |
|  | Vulcanization accelerator | 1 | 1 | 1 | 1 | 1 | 1 |
| Steel cord | Diameter of filament | 0.295 | 0.295 | 0.295 | 0.295 | 0.295 | 0.295 |
|  | Cu/Zn ratio | 63/37 | 63/37 | 63/37 | 63/37 | 63/37 | 83/37 |
|  | Strand structure | 1 × 2 | 1 × 2 | 1 × 2 | 1 × 2 | 1 × 2 | 1 × 2 |
| Vulcanization conditions | Amount of curing heat (ECU) | 55 | 55 | 35 | 55 | 35 | 55 |
|  | Curing temperature (° C.) | 185 | 185 | 185 | 150 | 150 | 185 |
| Fatty acid content (% by mass) of NR 1-1, NR 1-2, or NR 1-3 |  | 0.4 | 0.8 | 0.8 | 0.8 | 0.4 | 1.0 |
| Fatty acid content (% by mass) of topping rubber composition |  | 0.7 | 0.3 | 0.7 | 0.7 | 0.3 | 1.0 |
| Amount (% by mass) of fatty acids attached to steel cord surface |  | 0.6 | 0.6 | 0.6 | 0.6 | 0.3 | 1.0 |
| Initial adhesion |  | 120 | 110 | 110 | 110 | 150 | 100 |
| Adhesion after high temperature and high humidity aging |  | 120 | 110 | 110 | 110 | 150 | 100 |

The results in Tables 1-1 and 1-2 demonstrate that both better initial adhesion and adhesion after high temperature and high humidity aging were exhibited in the belts of the examples prepared from a rubber composition having a low fatty acid content and a specified cord than in the comparative example with a relatively high fatty acid content.

TABLE 2-1

|  | NR 2-1 (Highly purified natural rubber 2-A) | NR 2-2 (Highly purified natural rubber 2-B) | NR 2-3 (Highly purified natural rubber 2-a) |
| --- | --- | --- | --- |
| pH | 7.0 | 6.2 | 5.5 |
| Nitrogen content (% by mass) | 0.02 | 0.02 | 0.02 |
| Phosphorus content (ppm) | 108 | 106 | 107 |
| Sulfate ion concentration (% by mass) | 0.37 | 0.50 | 0.55 |

TABLE 2-2

| | | Example 2-1 | Example 2-2 | Comparative Example 2-1 |
| --- | --- | --- | --- | --- |
| Cord topping rubber composition Formulation (parts by mass) | NR 2-1 (Solid rubber (Highly purified natural rubber 2-A)) | 100 | | |
| | NR 2-2 (Solid rubber (Highly purified natural rubber 2-B)) | | 100 | |
| | NR 2-3 (Solid rubber (Highly purified natural rubber 2-a)) | | | 100 |
| | Carbon black | 50 | 50 | 50 |
| | Stearic acid | 2 | 2 | 2 |
| | Zinc oxide | 5 | 5 | 5 |
| | Antioxidant | 1 | 1 | 1 |
| | Oil | 6 | 6 | 6 |
| | Sulfur | 5 | 5 | 5 |
| | Vulcanization accelerator | 1 | 1 | 1 |
| Steel cord | Diameter of filament | 0.295 | 0.295 | 0.295 |
| | Cu/Zn ratio | 63/37 | 63/37 | 63/37 |
| | Strand structure | 1 × 2 | 1 × 2 | 1 × 2 |
| Vulcanization conditions | Amount of curing heat (ECU) | 55 | 55 | 55 |
| | Curing temperature (° C.) | 185 | 185 | 185 |
| Sulfate ion concentration (% by mass) in cord topping rubber composition | | 0.6 | 0.8 | 0.9 |
| Initial adhesion | | 110 | 105 | 100 |
| Adhesion after high temperature and high humidity aging | | 130 | 120 | 100 |

The results in Tables 2-1 and 2-2 demonstrate that both better initial adhesion and adhesion after high temperature and high humidity aging were exhibited in the belts of the examples prepared from a specified cord and a rubber composition containing a modified NR in which the modified NR was produced using sulfuric acid in the coagulation step but the sulfate ion concentration was low than in the comparative example with a relatively high sulfate ion concentration.

The invention claimed is:

1. A composite, comprising:
   a topping rubber composition having a fatty acid content of 0.8% by mass or less; and
   an adherend plated with a copper-containing layer, wherein the rubber composition comprises a natural rubber having a fatty acid content of 0.8% by mass or less.

2. The composite according to claim 1, wherein rubber composition rubber component consists only of natural rubber.

3. The composite according to claim 1, wherein not more than 0.8% by mass of fatty acids are attached to a surface of the adherend.

4. A pneumatic tire, comprising the composite according to claim 1.

* * * * *